United States Patent
Smith et al.

(10) Patent No.: US 11,021,609 B2
(45) Date of Patent: *Jun. 1, 2021

(54) ACTIVE POLYMER MODIFICATION OF BITUMEN FOR USE IN ROOFING MATERIALS

(71) Applicant: Garland Industries, Inc., Cleveland, OH (US)

(72) Inventors: Jason D. Smith, Strongsville, OH (US); Joseph W. Mellott, II, Stow, OH (US); Melissa Rus, Cleveland, OH (US); David Sokol, Vermillion Township, OH (US); Julia Holland, Cleveland, OH (US)

(73) Assignee: Garland Industries, Inc., Cleveland, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/245,684

(22) Filed: Jan. 11, 2019

(65) Prior Publication Data

US 2019/0177543 A1    Jun. 13, 2019

Related U.S. Application Data

(62) Division of application No. 14/624,672, filed on Feb. 18, 2015.

(60) Provisional application No. 61/944,687, filed on Feb. 26, 2014.

(51) Int. Cl.
*C08L 95/00* (2006.01)
*C08G 18/69* (2006.01)
*C08G 18/44* (2006.01)
*E04D 5/10* (2006.01)

(52) U.S. Cl.
CPC .............. *C08L 95/00* (2013.01); *C08G 18/44* (2013.01); *C08G 18/69* (2013.01); *E04D 5/10* (2013.01); *C08L 2205/03* (2013.01); *C08L 2555/50* (2013.01); *C08L 2555/74* (2013.01); *C08L 2555/84* (2013.01)

(58) Field of Classification Search
CPC ......... C08L 95/00; C08G 18/44; C08G 18/69; E04D 5/10
See application file for complete search history.

(56) References Cited

U.S. PATENT DOCUMENTS

| | | | |
|---|---|---|---|
| 6,271,305 B1* | 8/2001 | Rajalingam | C08G 18/6476 427/138 |
| 2005/0101210 A1* | 5/2005 | Bindschedler | C08L 95/00 442/136 |
| 2015/0240083 A1* | 8/2015 | Martin | C09C 1/28 106/415 |

* cited by examiner

*Primary Examiner* — John E Uselding
(74) *Attorney, Agent, or Firm* — Ulmer & Berne, LLP; Brian Turung; Eric Robbins

(57) ABSTRACT

A modified bitumen consisting of a polyurethane wherein the polyisocyanate or polyisocyanate-dominated polyurethane prepolymer (or prepolymers) is first reacted with the bitumen to take advantage of the bitumen's hydroxyl and amine functionality and form an isocyanate-bitumen adduct to form a weatherproofing product.

32 Claims, 2 Drawing Sheets

ACTIVE POLYMER MODIFICATION OF BITUMEN FOR USE IN ROOFING MATERIALS

The present invention is a continuation of U.S. patent application Ser. No. 14/624,672 filed Feb. 18, 2015, which in turn claims priority on U.S. Provisional Application Ser. No. 61/944,687 filed Feb. 26, 2014, which is incorporated herein by reference.

The present invention is directed to modified bitumen, more particularly to a modified bitumen that includes a polyurethane, still more particularly to a modified bitumen that includes a polyurethane wherein a polyisocyanate-terminated compound of any polymer backbone, or blends of backbones, can be reacted with specific constituents of bitumen to take advantage of hydroxyl and amine functionality within said constituents and form an isocyanate-bitumen adduct, yet more particularly to a modified bitumen that includes a polyurethane wherein the polyisocyanate-terminated compound of any polymer backbone, or blends of backbones, can be reacted with specific constituents of bitumen to take advantage of hydroxyl and amine functionality within said constituents and form an isocyanate-bitumen adduct and the remaining isocyanate groups on the adduct as well as any residual diisocyanate not reacted with the bitumen are reacted further with polyol(s), and still yet more particularly to a modified bitumen that includes a polyurethane wherein the polyisocyanate-terminated compound of any polymer backbone can be reacted with specific constituents of bitumen to take advantage of hydroxyl and amine functionality within said constituents and form an isocyanate-bitumen adduct as well as any residual diisocyanate not reacted with the bitumen are reacted further with polyol(s) to form a weatherproofing product (e.g., membrane, etc.).

BACKGROUND OF THE INVENTION

Bitumen is produced by the non-destructive distillation of crude petroleum during the refining process, making the exact composition of asphalt dependent on the chemical complexity of the original crude petroleum. Asphalt is a blend of bitumen and mineral substances but, within the scope of this invention, bitumen also encompasses asphalt. While no two bitumen specimens have the same chemical makeup, its composition can be divided into four main designations through analytic methods: saturates, aromatics, resins, and asphaltenes (otherwise known as SARA's). Bitumen behavior is greatly influenced by the relative concentration and chemical features of these four phases, especially that of asphaltene, the most polar of the phases. The asphaltene molecular structure has been measured over the decades and the finding is that the structure contains known hydroxyl (—OH) and amine (—NH) pendant groups. It is believed that under the right reaction conditions, these groups could be made to react with either monomeric and/or polymeric polyisocyanate and/or a prepolymer consisting of one or more polyester, polyether, hydroxyl-terminated polybutadiene, polycarbonate, and/or any imaginable hydroxyl-functional (functionality 2 or more) and polyisocyanate (e.g., see the polyisocyanate and polyol listing that can be used in U.S. Pat. No. 8,419,872, which is incorporated herein by reference). The reaction would create a bitumen/polyisocyanate adduct that can further react with —OH functional polyols of any molecular weight and/or any blend of functionality to improve the aforementioned physical properties of the asphaltic membranes.

SUMMARY OF THE INVENTION

The present invention is directed to the combining of two known waterproofing compounds: asphalt and polyurethane, wherein the asphaltene groups become an "active" component within the polyurethane matrix rather than a "passive" component when blended with SBS or other rubber used in the current art. Such a compound has been found to have improved weathering capabilities, mineral retention (SBS-modified bitumen can lose mineral surfacing when it ages), and more control over the polymer creation and thus overall properties.

The non-limiting reasons for incorporation of polyurethane into asphalt and/or a rubber-modified asphaltic roof membrane are:

Improved Mineral Adhesion and Retention—The mineral granules used in traditional rubber-modified asphalt formulations tend to remove themselves from the modified surface during long term exterior exposure, resulting in darker areas of exposed modified asphalt that will degrade faster over time. The urethane-modified bitumen of the present invention has shown exceptional mineral retention (as much as 3-10 times the amount) of roofing granules compared to the current art consisting of rubber-modified bitumen.

Improved Weatherability—The urethane backbone of an actively-modified polyurethane-based asphaltic material will have better weathering properties depending on its composition when compared to passively-modified rubber-based asphalt. Consider, for example, the traditional SBS-modified asphalt used in the current art. UV light and heat targets target specific molecular groups within the rubber, making those bonds more brittle, leading over time to cracking in the membrane. The urethane-modified bitumen disclosed in this application has been shown to have little or no surface cracking after 2400+ hours of aging in a weathering machine or exterior exposure compared to a modified bitumen specimen prepared by the current art.

Bitumen

The bitumen that can be used is non-limiting. Since the "reactive" component of this bitumen comes from the asphaltene and polar resins, the more asphaltene-rich colloidal microstructures in the bitumen, the larger degree of active modification is obtained. An asphaltene weight fraction of about 10-25% is shown to be receptive to active modification with the prepolymers described, but it can be as high as about 50%. The asphaltene weight fraction of the bitumen used in the present invention is generally about 5-55% (and all values and ranges therebetween), typically about 7-45%, more typically about 10-30%. In one non-limiting example, the bitumen is PG64-22 grade, which has about 15% asphaltene content (tested using an IATROSCAN—SARA Method). The more asphaltene is present, the more —OH and —NH reactive sites exist, and the more reactive sites are available for reaction with an —NCO group. In one non-limiting embodiment, the bitumen or blend of bitumen (when used) has a softening point about 43.3° C.-121.1° C. (110-250° F.) (and all values and ranges therebetween), typically, about 46.1° C.-76.7° C. (115° F.-170° F.), more typically about 47.8° C.-55.5° C. (118-132° F.); and a penetration typically of about 4-80 dmm (and all values and ranges therebetween) at 22.2° C. (75° F.), more typically about 25-75 dmm at 22.2° C. (75° F.), still more typically about 40-75 dmm at 22.2° C. (75° F.), yet more typically about 51-69 dmm at 22.2° C. (75° F.), and still yet more typically about 55-65 dmm at 22.2° C. (75° F.). The bitumen (when used) will be present in the composition in an amount of from about 25 wt. %-75 wt. % (and all values and ranges therebetween), typically from about 40%-60% wt. %.

Coal Tar

In non-limiting versions of this invention, coal tar can be used in place of bitumen, or blends of coal tar and bitumen can be used. The coal tar that can be used is non-limiting. Coal tax pitch is a dark brown to black amorphous residue left after coal tar is redistilled and is composed almost entirely of polynuclear aromatic compounds that generally constitute 48-65% by weight of the usual grades of coal tar. The coal tar pitch useful in the compositions of the present invention will have a softening point of from about 50° C.–70° C. (and all values and ranges therebetween), and can be of either Type I or Type III. Typically, Type I coal tar pitches have a softening point of from around 52° C. to 60° C., whereas Type III coal tar pitches have a softening point of from around 56° C. to 64° C. The coal tar pitch will be present in the composition in an amount of from about 25 wt. %-75 wt. % (and all values and ranges therebetween), and typically from about 50 wt. %-65 wt. %. When coal tar and bitumen are both used, the weight ratio of coal tar to bitumen is about 1:0.01-99, and typically about 1:0.1-9. In one non-limiting composition, the weight percent of the bitumen is greater than the weight percent of the coal tar; however, this is not required. In one non-limiting composition, the coal tar comprises from about 50 wt. %-70 wt. % coal tar pitch, about 10 wt. %-17 wt. % rubbery polymer having from about 50-95 parts by weight conjugated diene and from about 5-50 parts by weight monovinyl aromatics.

Polyisocyanate

The polyisocyanate compound can include aromatic, aliphatic, cycloaromatic and/or cycloaliphatic diisocyanates having molecular weights of up to about 500; however, higher molecular weights can be used. The —NCO functionality on the polyisocyanate (in the form of monomeric, polymeric, and/or prepolymeric) is what will react with the —OH and/or —NH pendant groups located on the asphaltene molecule. Hydroxyl (—OH) functional polyols are then reacted with the remaining unreacted monomeric, polymeric, and/or prepolymer —NCO pendant groups to further chain extend and crosslink the polymer. The prepolymer does not need to be NCO functional; it can be —OH functional as well, but it will not react with the —OH functional groups in the asphaltene and have very different properties. NCO/OH equivalent indicies can be about 0.6-8, but generally about 1-6, and typically about 3-4.

Non-limiting examples of suitable aromatic diisocyanates include isomers of toluene diisocyanate (TDI), naphthalene 1,5-diisocyanate (NDI), naphthalene 1,4-diisocyanate (NDI), diphenylmethane 4,4'-diisocyanate (MDI), diphenylmethane 2,4'-diisocyanate and mixtures of 4,4'-diphenylmethane diisocyanate with the 2,4' isomer, xylylene diisocyanate (XDI), 4,4'-diphenyl-dimethylmethane diisocyanate, di- and tetraalkyl-diphenylmethane diisocyanates, 4,4'-dibenzyl diisocyanate, 1,3-phenylene diisocyanate and 1,4-phenylene diisocyanate. Non-limiting examples of cycloaliphatic diisocyanates include 4,4'-dicyclohexylmethane diisocyanate ($H_{12}$MDI), 1-isocyanatomethyl-3-isocyanato-1,5,5-trimethyl-cyclohexane (isophorone diisocyanate, IPDI), cyclohexane 1,4-diisocyanate, hydrogenated xylylene diisocyanate ($H_6$XDI), 1-methyl-2,4-diisocyanato-cyclohexane, m- or p-tetramethylxylene diisocyanate (m-TMXDI, p-TMXDI) and dimer fatty acid diisocyanate. Non-limiting examples of aliphatic diisocyanates are tetramethoxybutane 1,4-diisocyanate, butane 1,4-diisocyanate, hexane 1,6-diisocyanate (HDI), 1,6-diisocyanato-2,2,4-trimethylhexane, 1,6-diisocyanato-2,4,4-trimethylhexane, lysine diisocyanate and 1,12-dodecane diisocyanate ($C_{12}$CDI)$_y$.

In another non-limiting embodiment of the invention, the one or more diisocyanate compounds include methylene diphenyl diisocyanate (MDI) and/or toluene diisocyanate (TDI). The MDI and/or TDI included in the polyurethane prepolymer can be pure MDI and/or TDI, and/or one or more isomers of MDI and/or TDI. As can be appreciated, almost any combination of compounds that can be used to form the polyurethane prepolymer can be used in the present invention. As such, any combinations of polyol, or polyols, with polyisocyanate, or polyisocyanates can be used in the present invention. The combination and type of compounds are selected to obtain the desired properties of the polyurethane. In one non-limiting aspect of this embodiment, MDI and/or TDI constitute at least about 40 weight percent of the diisocyanate compounds in the polyurethane prepolymer. In another non-limiting aspect of this embodiment, MDI and/or TDI constitute more than 50 weight percent of the diisocyanate compounds in the polyurethane prepolymer. In still another non-limiting aspect of this embodiment, MDI and/or TDI constitute at least about 60 weight percent of the diisocyanate compounds in the polyurethane prepolymer. In yet another non-limiting aspect of this embodiment, MDI and/or TDI constitute at least about 75 weight percent of the diisocyanate compounds in the polyurethane prepolymer. In still yet another non-limiting aspect of this embodiment, MDI and/or TDI constitute at least about 90 weight percent of the diisocyanate compounds in the polyurethane prepolymer. In a further non-limiting aspect of this embodiment, MDI and/or TDI constitute at least about 95 weight percent of the diisocyanate compounds in the polyurethane prepolymer. Non-limiting polyisocyanate compound that can be used is disclosed in U.S. Pat. No. 8,419,872 patent, which is incorporated herein by reference.

Polyols

One non-limiting goal of the polyol or polyol blends is to be used with a polyisocyanate (or polyisocyanates) to create polyurethane prepolymer that can be later reacted with the bitumen. Another non-limiting goal of the polyol or polyol blends is to react completely or substantially completely with the remaining available isocyanate (—NCO) groups. The one or more primary polyol (two- and/or three-functional, referred to as "diols" and "triols") compounds included in the polyurethane prepolymer and include a) polypropylene, and/or polybutylene glycols which can include di- and/or trifunctional polypropylene glycols with two or more hydroxyl groups per molecule in the molecular weight range of about 400-20,000; b) polyether polyols wherein the molecular weight range is about 200-4,000 molecular weight; c) hydroxyl-functional polybutadiene polyols wherein the molecular weight range is about 200-3000 molecular weight; d) polytetramethylene glycols (polybutylene glycols, poly(oxytetramethylene) glycol, poly-THF), wherein the molecular weight range of the polytetramethylene glycols is about 600-6,000 molecular weight; e) low molecular weight polyols, alkylene diols (e.g., butanediol, hexanediol, octanediol, decanediol, dodecanediol, etc.); and/or f) polyester-polyols such as the crystalline or partly crystalline polyester-polyols which can be prepared by condensation of di- or tricarboxylic acids (e.g., adipic acid, sebacic acid, glutaric acid, azelaic acid, suberic acid, undecanedioic acid, dodecandioic acid, 3,3-dimethylglutaric acid, terephthalic acid, isophthalic acid, hexahydrophthalic acid, polycaprolactone, etc.), dimer fatty acid with low molecular weight diols or triols (e.g., ethylene glycol, propylene glycol, diethylene glycol, triethylene glycol, dipropylene glycol, 1,4-butanediol, 1,6-hexanediol, 1,8-octanediol, 1,10-decanediol, 1,12-dodecanediol, dimer fatty alcohol, glycerol, trimethylolpropane, etc.).

Non-limiting examples of polyols that can be used include polypropylene glycols (Diol) [e.g., PLURACOL® by BASF, etc.]; propylene oxide adduct of glycerine (Triol) [e.g., PLURACOL® by BASF, etc.], polyether polyols (Diol & Triol) [e.g., VORANOL™ Polyols by Dow, ARCOL® Polyol by Bayer, ACCLAIM® Polyol by Bayer, ULTRACEL™ by Bayer, etc.]; hydroxyl functional polybutadiene polyols [e.g., POLY BD® and KRASOL®, from Cray Valley], polycarbonate diols [POLY-CD® 220 from Monument Chemical], polypropylene oxide-based polyol (Diol) [e.g., MULTRANOL® by Bayer, etc.]; 1,12-octadecanediol; 1,2,3-propanetriol; 1,2,6-hexanetriol; 1,2-ethanediol; 1,3-butanediol; 1,4-benzenediol; 1,9-nonanediol; 2,2,4,4-tetramethyl-1,3-cyclobutanediol; 2,2,4-trimethyl-1,3-pentanediol; 2,2-bis(hydroxymethyl)-1,3-propanediol; 2,2-diethyl-1,3-propanediol; 2,2-dimethyl-1,3-butanediol; 2,3-butanediol; 2,3-naphthalenediol; 2,4-hexadiyne-1,6-diol; 2,7-dimethyl-3,5-octadiyne-2,7-diol; 2-butyl-2-ethyl-1,3-propanediol; 2-ethyl-2-methyl-1,3-propanediol; 2-methyl-2-propyl-1,3-propanediol; 3-chloro-1,2-propanediol; 3-methyl-1,3-butanediol; 3-methyl-2,4-pentanediol; 9-octadecene-1,12-diol; actol 21-56 diol; actol 22-110 diol; actol 23-95 diol; actol 32-160 triol; actol 33-46 triol; butanediol; butanetriol; butenediol; butynediol; dimethyl octanediol; and dimethylhexanediol.

Generally, the polyols are petroleum-based polyols, but they can also be produced using soy, castor, or other so-called "green" sources. In one non-limiting aspect of this embodiment, two different primary polyol compounds are included in the polyurethane prepolymer. In one non-limiting formulation, the primary polyol compounds include a first primary polyol compound that is a diol or triol polyol having a molecular weight that is at least about 300 and up to about 5000 and a second primary polyol compound that is a diol or triol having a molecular weight of at least about 150 and up to about 7000. Generally the first primary polyol compound is a diol and the second primary polyol compound is a triol, but can also be a diol. The weight ratio of the higher weight primary polyol compound to the lower weight primary polyol compound is about 1-5:1, typically about 1.1-4:1, and more typically about 1.2-3.5:1. In another and/or alternative non-limiting aspect of this embodiment, the one or more primary polyol compounds included in the polyurethane prepolymer includes diol and/or triol. In still another non-limiting aspect of this embodiment, the diol and/or triol constitute at least about 40 weight percent of the one or more primary polyol compounds in the polyurethane prepolymer. In yet another non-limiting aspect of this embodiment, the diol and/or triol constitute more than 50 weight percent of the one or more primary polyol compounds in the polyurethane prepolymer. In still another non-limiting aspect of this embodiment, the diol and/or triol constitute at least about 60 weight percent of the one or more primary polyol compounds in the polyurethane prepolymer. In still yet another non-limiting aspect of this embodiment, the diol and/or triol constitute at least about 75 weight percent of the one or more primary polyol compounds in the polyurethane prepolymer. In a further non-limiting aspect of this embodiment, the diol and/or triol constitute at least about 90 weight percent of the one or more primary polyol compounds in the polyurethane prepolymer. In still a further non-limiting aspect of this embodiment, the diol and/or triol constitute at least about 95 weight percent of the one or more primary polyol compounds in the polyurethane prepolymer. In another non-limiting aspect of this embodiment, the one or more primary polyol compounds included in the polyurethane prepolymer include both diol and triol.

In another non-limiting aspect of this embodiment, the polyol or polyol blend can include about 200-20000 molecular weight of one or more diols, triols, and/or quadrols, and the polyol or polyol blend can be added in a quantity to create an NCO/OH equivalent ratio of about 1.2-15.1.

In another non-limiting aspect of this embodiment, the polyol or polyol blend can include about 1000-5000 molecular weight of one or more diols, triols, and/or quadrols, and the polyol or polyol blend can be added in a quantity to create an NCO/OH equivalent ratio of about 1.2-15:1.

In another non-limiting aspect of this embodiment, the polyol or polyol blend can include about 1000-3000 molecular weight of one or more diols, triols, and/or quadrols, and the polyol or polyol blend can be added in a quantity to create an NCO/OH equivalent ratio of about 1.2-15:1.

In another non-limiting aspect of this embodiment, the polyol or polyol blend can include about 1800-2200 molecular weight polyethylene glycol diol, and the polyol or polyol blend can be added in a quantity to create an NCO/OH equivalent ratio of about 1.2-15:1.

In still another non-limiting aspect of this embodiment, the one or more primary polyol compounds included in the polyurethane prepolymer include both diol and triol at a weight ratio of diol to triol of about 1-5:1, typically about 1.5-3:1, and more typically about 1.8-2.2:1. A weight ratio of greater than 5:1 has been found to cause the cross-link density to decrease, and eventually the tensile strength of the cured blend is not affected by the triol. A ratio of less than 1:1 (by weight) increases the chance of the polymer approaching or exceeding its gel point.

In yet another non-limiting embodiment of the invention, the equivalent ratio of the at least one polyisocyanate compound to the one or more primary polyol compounds in the polyurethane prepolymer is about 1.2-8:1, typically about 2-7:1, more typically about 3-6:1, still more typically about 4.5-5:1. In one non-limiting aspect of this embodiment, the polyurethane prepolymer includes at least about 5 weight percent of at least one polyisocyanate compound and more than 50 weight percent of one or more primary polyol compounds. In another non-limiting aspect of this embodiment, the polyurethane prepolymer includes about 10-30 weight percent of at least one diisocyanate compound 60-90 weight percent of one or more primary polyol compounds. In still another non-limiting aspect of this embodiment, the polyurethane prepolymer includes about 12-25 weight percent of at least one diisocyanate compound 65-88 weight percent of one or more primary polyol compounds. In yet another non-limiting aspect of this embodiment, the polyurethane prepolymer includes about 15-20 weight percent of at least one diisocyanate compound 70-85 weight percent of one or more primary polyol compounds. In still yet another non-limiting aspect of this embodiment, the polyurethane prepolymer includes about 18-20 weight percent of at least one diisocyanate compound 74-82 weight percent of one or more primary polyol compounds.

In addition to the primary and secondary polyols, one could also use low or high molecular weight polyols to be chain extenders and/or crosslinkers used to join the much larger polymer chains to form even longer polymers. Such chain extenders and/or crosslinkers can include, but are not limited to, propylene glycol, ethylene glycol, 1,3-butanediol, dipropylene glycol, and the like. Non-limiting polyols that can be used are disclosed in U.S. Pat. No. 8,419,872, which is incorporated herein by reference.

In one non-limiting composition, the combined weight percent of polyisocyanate and polyol used in the composition is generally about 1-70 wt. % (and all values and ranges therebetween), typically about 1-49 wt. %, more typically about 2-45 wt. %, still more typically about 3-40 wt. %, yet more typically about 3-30 wt. %, still yet more typically about 4-25 wt. %, even more typically about 7-20 wt. %, still even more typically about 10-17 wt. %, yet even more typically about 13-17 wt. %.

In one non-limiting embodiment, the combined weight percent of polyisocyanate and polyol in the composition is generally less than the combined weight percent of the bitumen and coal tar in the composition; however, this is not required. Generally the weight ratio of the combined weight percent of polyisocyanate and polyol in the composition to the combined weight percent of the bitumen and coal tar in the composition is about 0.05-0.7:1, typically about 0.1-0.5:1, and more typically about 0.2-0.4:1.

In one non-limiting formulation, diisocyanate (e.g., Polymeric MDI, etc.) is reacted with a non-linear diol at about 1.5-5:1 equivalent ratio, and then reacted further with about 1.1-3:1 equivalent blend of a linear diol and diol. A specific non-limiting formulation is 4,4'-MDI (diisocyanate) is reacted first with an about 1800-2200 molecular weight hydroxyl-functional polybutadiene (non-linear diol) at an about 2.5-3.5:1 equivalent ratio, then reacted further with about 1.5-2.5:1 equivalent blend of an about 1800-2200 molecular weight linear polybutadiene (linear diol) and an about 1800-2200 molecular weight polycarbonate diol (diol).

The blend of polyisocyanate compound and polyol prior to reacting with the bitumen and/or coal tar (i.e., pre-reacted prepolymer) can include an extended NCO-terminated prepolymer having about a 1.2-15:1 ratio of hydroxyl-terminated polybutadiene. The polyol or polyol blend can include one or more diols, triols, and/or quadrols, and the polyol or polyol blend can be added in a quantity to create an NCO/OH equivalent ratio of about 1.2-8:0.001-20. The pre-reacted prepolymer can be formed from an extended NCO-terminated prepolymer having about a 1-15:1 NCO/OH equivalent ratio consisting of about 200-20000 MW hydroxyl-terminated polybutadiene, and the polyol or polyol blend can include about 200-20000 MW of one or more diols, triols, and/or quadrols, and the polyol or polyol blend can be added in a quantity to create an NCO/OH equivalent ratio of 1.2-8:0.001-20. The pre-reacted prepolymer can be formed from an extended NCO-terminated prepolymer having about a 1.2-15:1 ratio of 1000-5000 molecular weight hydroxyl-terminated polybutadiene, and the polyol or polyol blend can include about 1000-5000 molecular weight of one or more diols, triols, and/or quadrols, and the polyol or polyol blend can be added in a quantity to create an NCO/OH equivalent ratio of 1.2-8:1. The pre-reacted prepolymer can be formed from an extended NCO-terminated prepolymer having about a 1.2-15:1 ratio of about 1000-3000 molecular weight hydroxyl-terminated polybutadiene, and the polyol or polyol blend including about 1000-3000 molecular weight of one or more diols, triols, and/or quadrols, said polyol or polyol blend can be added in a quantity to create an NCO/OH equivalent ratio of 1.2-8:1. The pre-reacted prepolymer can be formed from an extended NCO-terminated prepolymer having about a 1.2-15:1 equivalent ratio of about 1800-2200 molecular weight hydroxyl-terminated polybutadiene, and the polyol or polyol blend including about 1800-2200 MW polycarbonate diol, and the polyol or polyol blend can be added in a quantity to create an NCO/OH equivalent ratio of 1.2-8:1.

Filler

A filler can optionally be used. The filler can be one or more of any of the typical types of fillers used in the art. Non-limiting fillers include fire retardant, calcium carbonate, talc, ammonium polyphosphate, ATH (Alumina Trihydrate ($Al_2O_3.3H_2O$)) or $Mg(OH)_2$. The fillers can be used for fire retardancy, etc. Additional fillers are disclosed in U.S. Pat. No. 8,419,872, which is incorporated herein by reference. When a filler is used, the content of the filler is generally about 1-66 wt. % (and all values and ranges therebetween), typically about 30-41 wt. %, and more typically about 34-38 wt. %. One non-limiting filler that can be used includes about 5-40 wt. % calcium carbonate (and all values and ranges therebetween), about 0.5-20 wt. % ATH (and all values and ranges therebetween), and about 0.1-5 wt. % ammonium polyphosphate (and all values and ranges therebetween); and more typically about 20-30 wt. % calcium carbonate, about 5-15 wt. % ATH, and about 0.5-2 wt. % ammonium polyphosphate.

Rubber

A SBS (styrene-butadiene-styrene), SEBS (styrene ethylene butylene styrene), SIS (styrene isoprene styrene), nitrile rubber, or any rubber can be used in conjunction with the polyurethane prepolymer into the asphalt, but is not necessary. Additional rubbers are disclosed in U.S. Pat. No. 8,419,872, which is incorporated herein by reference. In one non-limiting arrangement, the rubber (when used) can be blended with the urethane from about 1:0.1-99.9 by weight to rubber (and all values and ranges therebetween), typically about 1:0.1-10 by weight urethane to rubber, more typically about 1:0.2-15 by weight urethane to rubber, still more typically about 1:0.2-5 by weight urethane to rubber, and still more typically about 1:0.3-3 by weight urethane to rubber. In one non-limiting formulation, the urethane content is less than the rubber content. In another non-limiting formulation, the urethane content is greater than the rubber content. In one non-limiting composition, the rubber has a block monomer distribution in the form of A-B-A wherein each end block A is a polymer block of a polymerized monovinyl aromatic monomer and the midblock B is a polymer block of polymerized diene. The weight percent of the rubber (when used) can be about 1-30 wt. % (and all values and ranges therebetween), typically about 1-20 wt. %, more typically about 1-10 wt. %, still more typically about 2-5 wt. %. In one non-limiting composition, the weight percent of rubber is less than the combined weight percent of the bitumen and coal tar; however, this is not required.

Processing Oils

A non-limiting component of the invention uses a processing oil that includes virtually any hydrocarbon oil or mixture thereof that is commonly used in bitumen and/or coal tar compounding or as a plasticizer and processing aid (such as a naphthelinic or paraffinic oil containing varying aromatic contents) can be used, but is not necessary. The extender should be compatible with the components of the formula. Specific, non-limiting examples of suitable extender oils include Sundex 790T from Sunoco, ProGuard Altranap 1000 from Lynden Oil Co., and Amplex® 100 from Citgo. Additional processing oils are disclosed in U.S. Pat. No. 5,455,291, which is incorporated herein by reference. The processing oil (when used) can be about 0.1-30 wt. %

(and all values and ranges therebetween), typically about 0.5-5 wt. %, and more typically about 1-3 wt. %. In one non-limiting formulation, the coal tar and/or bitumen includes about 10-15 wt. % of an extender oil having an aromatic content such that the composition contains less than about 8 wt % aromatic oil exclusive of any aromatics resulting from the coal tar and/or bitumen.

Modifiers

A modifier can optionally be used. Non-limiting modifiers include cross-linkers that can be used to help increase cross link density (amines, for example), antioxidants, UV stabilizers to prevent degradation, etc. Additional modifiers are disclosed in U.S. Pat. No. 8,419,872, which is incorporated herein by reference. The modifiers (when used) can about 0.01-5 wt. % (and all values and ranges therebetween), and typically about 0.1-1 wt. %.

Antioxidants

An antioxidant can optionally be used. There are typical ones in the industry. The antioxidant can be used to further improve the stability of the composition. The antioxidants (when used) can be about 0.01-5 wt. % (and all values and ranges therebetween), and typically about 0.1-1 wt. %. Non-limiting antioxidants include Irgonox® 1010 (BASF), CYASORB® UV stabilizers (Cytec).

Catalysts

A catalyst can optionally be used. One non-limiting catalyst is dibutyltin dilaurate. Additional catalysts are disclosed in U.S. Pat. No. 8,419,872, which is incorporated herein by reference. The addition of a catalyst can be used to control the reaction speed. Care needs to be taken when using catalysts because of gellation risks. Generally, no more than 1 wt. % is recommended (e.g., 0.01-1 wt. % and all values and ranges therebetween). Non-limiting catalyst that can be used includes 1,3,5-(tris(3-dimethylamino)propyl)-hexahydro-s-triazine, 1,8-diazabicyclo[5,4,0]undecene-7 (DBU), 1,4-diazabicyclo[2,2,2]octane, tetramethylbutanediamine (TMBDA), benzyldimethylamine (BDMA), bis-(2-dimethylaminoethyl)ether, dibutyltin dilaurate, dibutyltin oxide, dimethylcyclohexylamine (DMCHA), dimethylethanolamine (DMEA), dioctyltin mercaptide, N-ethylmorpholine, N-(3-dimethylaminopropyl)-N,N-diisopropanolamine, N'-(3-(dimethylamino)propyl)-N,N-dimethyl-1,3-propanediamine, N,N,N'-trimethyl-N'-hydroxyethyl-bis(aminoethyl)ether, pentamethyldiethylenetriamine (PMDETA), pentamethyldipropylenetriamine, phenylmercuric neodeconate, tin mercaptides, triethylamine (TEA), triethylenediamine (TEDA).

NON-LIMITING FORMULATIONS

Figure 1:
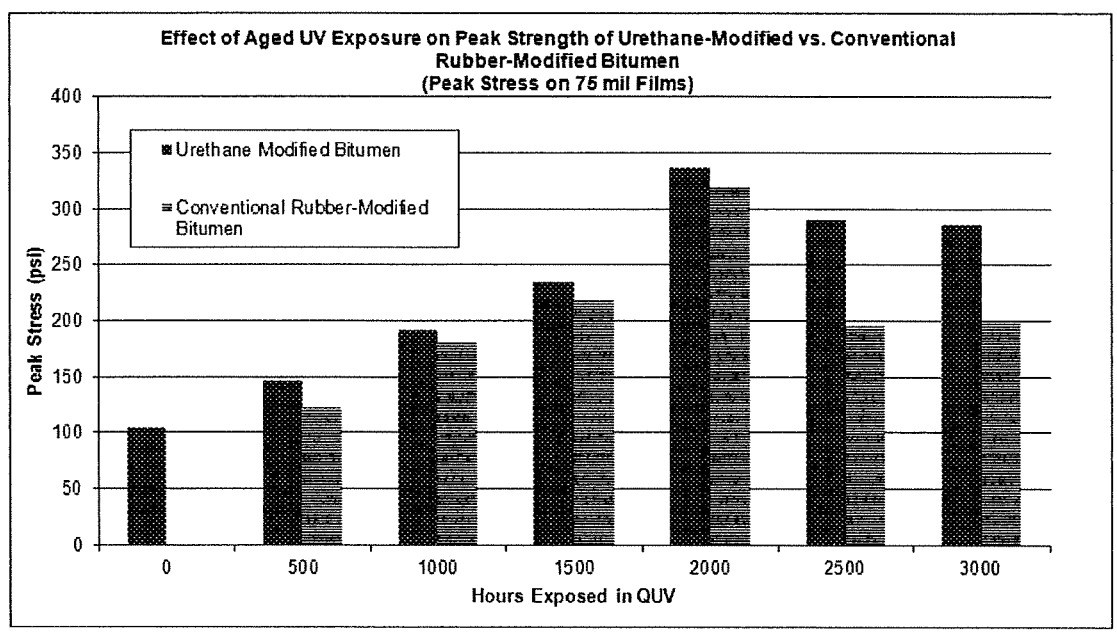
FIG. 1 is a graph that illustrates the effect if aged UV exposure on peak strength of conventional rubber-modified bitumen to the urethane modified formulation of the present invention; and, FIG. 2 is a graph illustrating the amount of mineral loss of a conventional mineral cap sheet to a sheet that includes the urethane modified formulation of the present invention.

One non-limiting formula of the present invention comprises bitumen and/or coal tar, polymer and optional filler. The polymer can be any blend of polyisocyanate/polyol or polyols and/or styrenated rubber or rubbers from about 1-25 wt. % loading. Generally, about 8-20 wt. % total polymer loading by weight of total formula is used. Polyol order of addition with respect to the diisocyanate is important. The polyols can be blended in any order with respect to the polyisocyanate, with different results expected with each different order of addition. The bitumen and/or coal tar is actively modified by reacting the isocyanate end groups in the polyurethane with the hydroxyl end groups found in the bitumen and/or coal tar. As such, the polyurethane can have isocyanate functionality; however, this is not required. Each of these formula examples was compared to a control representing what could be considered the current art consisting of the following composition:

Control—Typical SBS-Modified Formula

| Component | Weight Percent |
|---|---|
| Bitumen | 50% |
| Lineal SBS Rubber | 15% |
| Filler | 35% |

Formula 1:

| Component | Weight Percent |
|---|---|
| Bitumen | 30-70% |
| Diisocyanate (monomeric, polymeric, prepolymeric | 4-20% |
| Polyol (diol, triol, diol/diol blend, diol/triol blend, etc.) | |
| Filler (includes any calcium carbonate, fire retardants, etc.) | 10-66% |

Example 1—Based on Formula 1

| Component | Component | Weight Percent |
|---|---|---|
| PG 64-22 (or other bitumen) | Bitumen | 50-55% |
| Rubinate 9433 | 4,4-MDI | 8-20% |
| R45HTLO | Hydroxy-terminated polybutadiene | |
| Krasol LBH 2000 | Linear Hydroxy-terminated polybutadiene | |
| Poly CD220 | 2000 MW Polycarbonate diol | |
| CaCO$_3$, Aluminum trihydrate (ATH), Potassium polyphosphate | Filler, Flame retardant | 30-41% |

Example 2—Based on Formula 1

| Component | Component | Weight Percent |
|---|---|---|
| PG 64-22 (or other bitumen) | Bitumen | 50-55% |
| Hyperlast LP 5610 | Linear butadiene/MDI based diisocyanate terminated prepolymer | 8-20% |
| R45HTLO | Hydroxy-terminated polybutadiene | |
| Poly CD220 | 2000 MW Polycarbonate diol | |

| Component | Component | Weight Percent |
|---|---|---|
| CaCO₃, Aluminum trihydrate (ATH), Potassium polyphosphate | Filler, Flame retardant | 30-41% |

One non-limiting method for creating the composition of Formula 1 and Example 1 is to add the monomeric, polymeric, or prepolymeric diisocyanate to the molten bitumen or a blend of bitumen and fillers at a process temperature of about 160-179.4° C. (320-355° F.) for about 10-60 minutes (e.g., 25-35 min., etc.). Then, after determination of residual % NCO using potentiometric titration or other method familiar to those skilled in the art, enough polyol is added to react with the remaining isocyanate pendant groups. The blend of polyols will help determine the physical properties of the final product, so choice of blend is important. Another non-limiting method for creating the composition of Formula 1 and Example 1 is to first extend the prepolymeric diisocyanate further using processes familiar to those in the art with additional polyol or polyol blends such that the extended prepolymer increases in molecular weight, but still maintains some NCO functionality, but said NCO functionality is lower than the initial prepolymer's NCO content. Said extended NCO-dominated prepolymer is then added to molten bitumen or a blend of molten bitumen and fillers at 160-179.4° C. (320-355° F.). After allowing the reaction of the NCO-terminated prepolymer and hydroxyl pendant groups of the asphaltine molecules within the bitumen, titration can be used to determine if any residual —NCO exists, which in turn can be used to calculate the equivalents of an optional amount of chain extender or other polyol and/or amine structure to increase viscosity, but is not necessary.

FORMULA 2: Active Modification of SBS-Modified Asphalt

| Component | Weight Percent |
|---|---|
| Bitumen | 50-55% |
| Rubber (SBS, SEBS, SIS, and blends thereof) | 4-20% Loading Total at Various Ratios |
| Diisocyanate (monomeric, polymeric, or prepolymeric) Polyol (diol, triol, diol/triol blend) | |
| Filler | 10-66% |
| Process Oil | 1-5% |

Example 3—Based in Formula 2

| Component | Component | Weight Percent |
|---|---|---|
| PG 64-22 | Bitumen | 50-55% |
| SBS, SIS, SEBS (or blends thereof) | Rubber | In various weight ratios such that the overall weight % is less than or equal to 20% |
| Polymeric MDI | NCO-terminated polymeric diisocayante | |
| PPG 2000 | 2000 MW polyol | |
| Voranol 220-530 | 500 MW diol | |
| CaCO₃, Aluminum trihydrate, Ammonium polyphosphate | Filler, flame retardant | 30-41% |
| Naphthenic process oil | Process oil | 1-3% |

One non-limiting method for creating the composition of Formula 2 and Example 3 is to first blend the SBS, SIS, and/or SEBS or blend thereof into molten asphalt, followed by the fillers. Once the rubber/asphalt blend is fully associated, the polymeric diisocyanate follows, but the prepolymer can be extended ahead of time with a polyol blend, but is not necessary. Reaction temperature should remain between 160-179.4° C. (320-355° F.); higher temperature increases the risk of gelation.

Table 1 shows physical properties observed in modified bitumen roofing membranes made with the aforementioned formulations compared to a control produced using conventional processes.

TABLE 1

Physical Properties Observed With Invention vs. Control

| Component | Control | Example 1 | Example 2 | Example 3 |
|---|---|---|---|---|
| Softening Point (ASTM D3461, ° F.) | 272° F. | 400° F. | 400° F. | 290° F. |
| Penetration (ASTM D5, Units) | 20 dmm | 21 dmm | 31 dmm | 22 dmm |
| Compound Stability (ASTM D5147) | Pass 225° F. | Pass 225° F. | Pass 225° F. | Pass 220° F. |
| Granule Loss (%, Dry, ASTM D4977) | 4% | 0.7% | 0.9% | 2% |
| Aged Appearance 4000 hours in Q-Sun Weathering | Some cracking, shrinkage, sagging. Some blisters | No cracking, shrinkage, sagging, blisters | No cracking, shrinkage, sagging, blisters | No cracking, shrinkage, sagging, blisters |
| Low Temperature Flexibility | Pass −50° F. | Pass −10° F. | Pass −20° F. | Pass −30° F. |
| Granule Loss after 4000 h Exposed in Georgia (%, Dry, ASTM D4977) | 6% | 1% | 1% | DNT |
| Granule Loss after 4000 h Exposed in California (%, Dry, ASTM D4977) | 7% | 1% | 1% | DNT |

DNT: Did not test

Table 1 shows that for the membrane made using Example 1, wherein only polyurethane comprised the total polymer content, the softening point increased to 400° F., which translates to improved high temperature sag resistance. In fact, even when exposed to 300° F., the membrane made with Example 1 did not show any signs of sag or mineral loss, while the control softened to the point where flow occurred. However, the membrane retained its flexibility at low temperature. The mineral roofing membrane created with Example 3 had properties closer to that of the Control. This is to be expected as the asphalt will take on properties of both polymers.

ASTM D412 Stress-Strain Testing of QUV-Aged Films

To demonstrate the resistance to aging of the invention made by the Examples (specifically Example 1), films of just the modified bitumen were placed into a QUV chamber for 3000+ hours and tested at 500 hour intervals to determine peak stress values. At these intervals, 1" wide strips were cut and pulled on a tensile tester until failure. FIG. 1 shows the results.

The data in FIG. 1 shows that prior to 2000 hours there is a steady increase in strength which occurs as a result of UV-induced crosslinking reactions that can occur in both traditional rubber and urethanes. Significantly, beyond 2000 hours there is a 13% decrease in strength in the urethane compared to a nearly 40% decrease in strength with the conventional modified bitumen as the films are continually exposed in the intense UV-rich environment. This trend continues with little change to 3000 hours.

ASTM 4977 Scrub Testing—Mineral Loss

Figure 2:
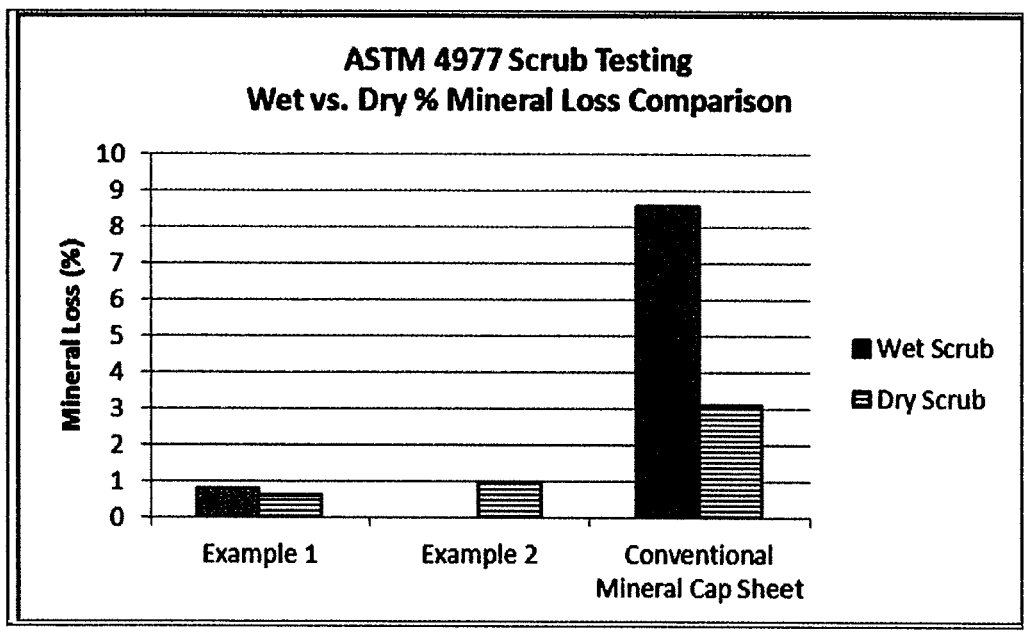

The mineral retention properties of the membrane made by the Examples (specifically Example 1), show significant improvement over the conventionally produced roofing membrane. When the substrates were aged over 4000 hours in California and Georgia, mineral retention in Example 1 was 6-7 times better than the conventional roofing membrane. To further test the invention's mineral retention, specimens of mineral roofing membranes made with Example 1 were soaked for 72 hours in water, and then a granule loss test was performed on the wet aged samples alongside a control similarly conditioned. The results are shown in FIG. 2.

Wet vs. Dry Scrub Test Results

Wet scrub testing was not performed on Example 2. The data in FIG. 2 clearly shows that Example 1 has an eight-fold improvement in mineral retention vs. the conventional mineral cap sheet. When tested dry, Examples 1 and 2 still show a three-fold improvement in mineral loss.

ASTM D4798 Cycle A-1 Weathering

As a demonstration of the improved weatherability of the invention, environmental aging was performed in a Q-Sun Model XE-3-HS (Q-Lab). Exposures of the non-limiting examples of the invention verses a similarly prepared convention mineral cap sheet show that, after more than 4000 hours subjected to ASTM D4798 Cycle A-1, wherein the prepared panels were subjected to a continuous hourly cycle consisting of a 51-minute light only exposure of "noon day sun" at 60° C. at equilibrium, followed immediately by a 9-minute period of light/water spray, Examples 1 and 2 show no signs of blistering or surface defects, while the conventional mineral cap sheet had begun to show signs of small blisters on the surface.

It will thus be seen that the objects set forth above, among those made apparent from the preceding description, are efficiently attained, and since certain changes may be made in the constructions set forth without departing from the spirit and scope of the invention, it is intended that all matter contained in the above description and shown in the accompanying drawings shall be interpreted as illustrative and not in a limiting sense. The invention has been described with reference to preferred and alternate embodiments. Modifications and alterations will become apparent to those skilled in the art upon reading and understanding the detailed discussion of the invention provided herein. This invention is intended to include all such modifications and alterations insofar as they come within the scope of the present invention. It is also to be understood that the following claims are intended to cover all of the generic and specific features of the invention herein described and all statements of the scope of the invention, which, as a matter of language, might be said to fall therebetween.

What is claimed:

1. An actively modified polymer-modified bitumen formulation comprising:
   25-75 wt. % of a first component that consists of bitumen, coal tar, or combinations thereof;
   1-49 wt. % of a second component that consists of polyurethane, or blend of polyurethane and rubber, said polyurethane including isocyanate end groups, said polyurethane formed from a polyisocyanate compound and a polyol, said polyol includes a molecular weight compound of 1000-5000 molecular weight, a content of said polyol creating a NCO/OH equivalent ratio of 2:1 to 7:1 in said bitumen formulation; and,
   1-66 wt. % of a filler;
   wherein a weight percent of said first component is greater than a weight percent of said second component, said isocyanate end groups in said polyurethane formulated to be reactable with hydroxyl end groups in said bitumen, said coal tar, or combinations thereof, said formulation can be used to create a membrane having improved mineral retention and weatherability.

2. The formulation as defined in claim 1, wherein said polyol includes at least one compound selected from the group consisting of propylene glycol, polycarbonate diol, polybutadiene glycols and polybutadiene polyols.

3. The formulation as defined in claim 1, wherein said polyol includes at least two compounds selected from the group consisting of propylene glycol, polycarbonate diol, polybutadiene glycols and polybutadiene polyols.

4. The formulation as defined in claim 1, wherein said polyol includes at least three compounds selected from the group consisting of propylene glycol, polycarbonate diol, polybutadiene glycols and polybutadiene polyols.

5. The formulation as defined in claim 3, wherein said polyol includes two different types of compounds selected from the group consisting of propylene glycol and polycarbonate diol.

6. The formulation as defined in claim 4, wherein said polyol includes two different types of compounds selected from the group consisting of propylene glycol and polycarbonate diol.

7. The formulation as defined in claim 1, wherein said NCO/OH equivalent ratio is 3:1 to 6:1.

8. The formulation as defined in claim 1, wherein said filler includes at least one compound selected from the group consisting of potassium polyphosphate, calcium carbonate, ammonium polyphosphate, alumina trihydrate and $Mg(OH)_2$.

9. The formulation as defined in claim 8, wherein said filler includes three or more compounds selected from the group consisting of calcium carbonate, ammonium polyphosphate, alumina trihydrate and potassium polyphosphate.

10. The formulation as defined in claim 8, wherein said filler includes calcium carbonate, ammonium polyphosphate, and alumina trihydrate.

11. The formulation as defined in claim 8, wherein said filler includes calcium carbonate, ammonium polyphosphate, and alumina trihydrate, a content of said calcium carbonate is 5-40 wt. %, a content of said ammonium polyphosphate is 0.1-5 wt. %, a content of said alumina trihydrate is 0.5-20 wt. %.

12. The formulation as defined in claim 1, wherein said second component includes both said polyurethane and said rubber, said rubber including one or more compounds selected from the group consisting of SBS, SEBS, SIS, and nitrile rubber, a weight ratio of said rubber to said polyurethane is 1:0.2 to 1:15.

13. The formulation as defined in claim 1, wherein said first component includes a blend of said coal tar and said bitumen, a weight ratio of said coal tar and said bitumen 1:0.1 to 1:10.

14. The formulation as defined in claim 1, further including two or more additional components selected from the group consisting of processing oil, chain extender, modifier, antioxidant, and catalyst, said additional components having a weight percent of 10-66.

15. The formulation as defined in claim 1, wherein said polyol includes both diols and triols, a weight ratio of said diols to said triols is about 1:1 to 5:1.

16. The formulation as defined in claim 1, wherein said polyurethane includes at least one chain extender.

17. The formulation as defined in claim 1, wherein said chain extender includes one or more compounds selected from the group consisting of propylene glycol, ethylene glycol, 1,3-butanediol, and dipropylene glycol.

18. The formulation as defined in claim 1, wherein said polyol includes a molecular weight compound of 1000-3000.

19. The formulation as defined in claim 1, comprising by weight percent:

| | |
|---|---|
| Bitumen and/or coal tar | 30-70 |
| Polyurethane | 4-20% |
| Filler | 10-66. |

20. The formulation as defined in claim 1, comprising by weight percent:

| | |
|---|---|
| Bitumen and/or coal tar | 50-55 |
| Polyurethane | 8-20 |
| Filler | 30-41. |

21. The formulation as defined in claim 1, comprising by weight percent:

| | |
|---|---|
| Bitumen and/or coal tar | 50-55 |
| Polyurethane | 8-20 |
| Filler | 30-41 |
| Process oil | 1-5. |

22. The formulation as defined in claim 1, comprising by weight percent:

| | |
|---|---|
| Bitumen and/or coal tar | 50-55 |
| Polyurethane | 8-20 |
| Filler | 30-41 |
| Process oil | 1-3. |

23. The formulation as defined in claim 1, comprising by weight percent:

| | |
|---|---|
| Bitumen and/or coal tar | 25-75 |
| Polyurethane | 2-49 |
| Filler | 1-66 |
| Process Oil | 1-20 |
| Rubber | 1-30 |
| Modifier | 0.01-5 |
| Antioxidant | 0.01-5 |
| Catalyst | 0.01-1. |

24. The formulation as defined in claim 1, comprising by weight percent:

| | |
|---|---|
| Bitumen | 50-55 |
| Calcium Carbonate | 5-40 |
| Aluminum Trihydrate | 0.5-20 |
| Ammonium Polyphosphate | 0.1-5 |
| Polyurethane | 8-20. |

25. An actively modified polymer-modified bitumen formulation comprising:
30-70 wt. % of a first component that consists of bitumen, coal tar, or combinations thereof;
4-20 wt. % of a second component that consists of polyurethane, or blend of polyurethane and rubber, said polyurethane including isocyanate end groups, said polyurethane formed from a polyisocyanate compound and a polyol, said polyol includes a molecular weight compound of 1000-5000 molecular weight, said polyol includes at least two compounds selected from the group consisting of propylene glycol, polycarbonate diol, polybutadiene glycols and polybutadiene polyols, a content of said polyol creating a NCO/OH equivalent ratio of at least 2:1 and no greater than 15:1 in said bitumen formulation; and,
10-66 wt. % of a filler;
wherein a weight percent of said first component is greater than a weight percent of said second component, a weight ratio of said polyisocyanate and said polyol to said first component is 0.1:1 to 0.5:1, said isocyanate end groups in said polyurethane formulated to be reactable with hydroxyl end groups in said bitumen, said coal tar, or combinations thereof, said formulation can be used to create a membrane having improved mineral retention and weatherability.

26. The formulation as defined in claim 25, wherein said polyol includes both diols and triols, a weight ratio of said diols to said triols is about 1:1 to 5:1.

27. The formulation as defined in claim 26, comprising by weight percent:

| | |
|---|---|
| Bitumen | 50-55 |
| Calcium Carbonate | 5-40 |
| Aluminum Trihydrate | 0.5-20 |
| Ammonium Polyphosphate | 0.1-5 |
| Polyurethane | 8-20. |

28. An actively modified polymer-modified bitumen formulation comprising:

40-60 wt. % of a first component that consists of bitumen, coal tar, or combinations thereof;

4-20 wt. % of a second component that is formed of a polyurethane material, said polyurethane material including isocyanate end groups, said polyurethane material formed from a polyisocyanate compound and a polyol, said polyol includes a molecular weight compound of 1000-5000 molecular weight, said polyol includes at least two compounds selected from the group consisting of dipropylene glycol, propylene glycol, polycarbonate diol, polybutadiene glycol and polybutadiene polyol, a content of said polyol creating a NCO/OH equivalent ratio of at least 2:1 and no greater than 15:1 in said bitumen formulation;

wherein a weight percent of said first component is greater than a weight percent of said second component, a weight ratio of said polyisocyanate, and said polyol to said first component is 0.1:1 to 0.5:1, said isocyanate end groups in said polyurethane formulated to be reactable with hydroxyl end groups in said bitumen, said coal tar, or combinations thereof, said formulation formulated to create a membrane having improved mineral retention and weatherability.

29. The formulation as defined in claim 28, wherein said polyol includes at least three compounds selected from the group consisting of dipropylene glycol, propylene glycol, polycarbonate diol, polybutadiene glycol, and polybutadiene polyol.

30. The formulation as defined in claim 28, wherein said polyol includes at least two compounds selected from the group consisting of hydroxy-terminated polybutadiene, linear hydroxy-terminated polybutadiene, and polycarbonate diol.

31. The formulation as defined in claim 28, wherein said polyol includes hydroxy-terminated polybutadiene, linear hydroxy-terminated polybutadiene, and polycarbonate diol.

32. An actively modified polymer-modified bitumen formulation comprising:

25-75 wt. % of a first component that consists of bitumen, coal tar, or combinations thereof;

1-49 wt. % of a second component that consists of polyurethane, or blend of polyurethane and rubber, said polyurethane including isocyanate end groups, said polyurethane formed from a polyisocyanate compound and a polyol, said polyol includes a molecular weight compound of 1000-5000 molecular weight, a content of said polyol creating a NCO/OH equivalent ratio of 2:1 to 15:1 in said bitumen formulation;

wherein a weight percent of said first component is greater than a weight percent of said second component.

* * * * *